UNITED STATES PATENT OFFICE.

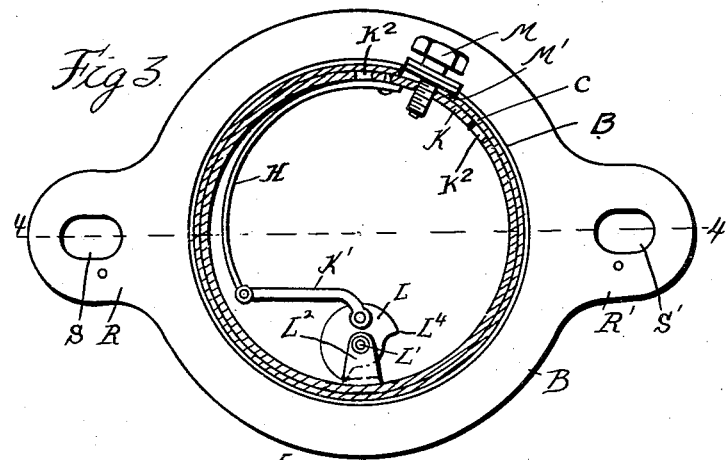
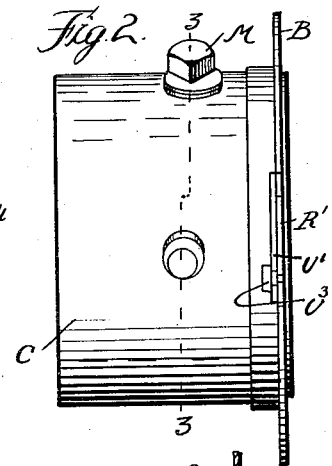
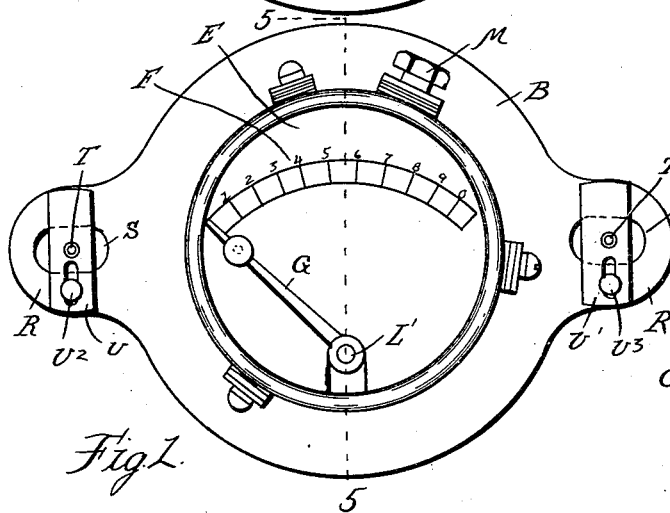
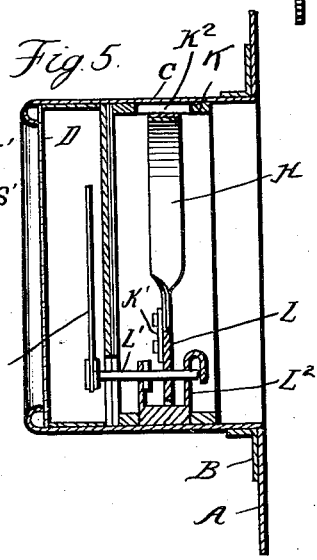
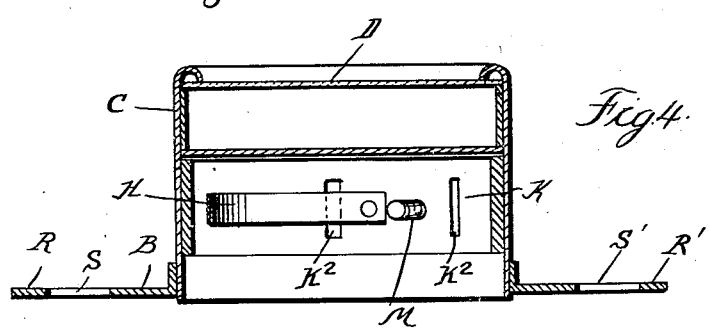

LLOYD G. COPEMAN, OF FLINT, MICHIGAN, ASSIGNOR TO COPEMAN ELECTRIC STOVE COMPANY, OF FLINT, MICHIGAN, A CORPORATION OF MICHIGAN.

ADJUSTABLE THERMOMETER.

1,312,834.      Specification of Letters Patent.      Patented Aug. 12, 1919.

Original application filed July 29, 1916, Serial No. 112,173. Divided and this application filed July 5, 1917. Serial No. 178,566.

*To all whom it may concern:*

Be it known that I, LLOYD GROFF COPEMAN, a citizen of the United States of America, residing at Flint, in the county of Genesee and State of Michigan, have invented certain new and useful Improvements in Adjustable Thermometers, of which the following is a specification, reference being had therein to the accompanying drawings.

This invention relates to adjustable thermometers and refers more particularly to a thermometer adapted to indicate oven temperatures, although the invention in its broader aspects is not limited to the particular use specified.

Among the objects of the invention are to provide a thermometer which can be adjusted without completely disassembling the same; to provide a construction in which the thermometers attached to the various stoves can be adjusted to have substantially the same temperature readings; to provide a construction in which the thermometer can be readily attached to the door or other parts of the stove without the necessity of exactly lining up the parts; to provide a construction in which the necessity of insulation between the metal flange of the thermometer and the metal part of the door is avoided; to provide a construction in which the adjustment of the expansion strip is controlled by a cap screw which extends to the outside of the thermometer; to provide a thermometer of the character above referred to which can be easily and accurately adjusted; and in general to provide a new and improved construction of thermometer.

The invention also resides in such features of construction and arrangements and combinations of parts as will more fully hereinafter appear.

In the drawings:

Figure 1 is a front elevation of a thermometer embodying my invention;

Fig. 2 is a side elevational view;

Fig. 3 is a cross section on the line 3—3 of Fig. 2;

Fig. 4 is a cross section on the line 4—4 of Fig. 3; and

Fig. 5 is a cross section on the line 5—5 of Fig. 1.

Describing in detail the construction shown in the drawings, A designates an oven-door lining and B an angle ring with which the thermometer casing C is provided. The angle ring B is secured to the rear end of the outside shell C, the front end being provided with the usual mica disk D through which the dial E of the thermometer may be observed. An indicating segment F is disposed on the dial, as shown in Fig. 1, to coöperate with a hand G which is moved by the expansion of the thermostatic strip H, when subjected to changes in temperature, to indicate the degree of heat in the oven. One end of the strip H is secured to an adjustable retainer strip K while its opposite or free end is connected to one end of a link K', the other end of which is secured to a cam or rock arm L on a shaft L'. The shaft L' is rotatably mounted in a bracket L² and carries the hand G. A shoulder L⁴ of the cam L serves to limit the movement of the hand G through contact with the bottom portion of bracket L².

Heretofore, it has generally been found necessary to effect adjustments of an oven thermometer, after installation, by bending the expansion strip to increase or decrease its tension, but such adjustment could not be effected without removing and disassembling the thermometer. In the present construction, any desired adjustments of the expansible strip may be made from the exterior of the casing and without dismounting the thermometer.

As shown in detail in Fig. 3, the adjustable retainer strip K, to which the expansion strip H is secured, has a set screw M projecting outward through a slot M' in the casing. The arrangement is such that the set screw M may be loosened and the retainer strip shifted circumferentially to place the desired strain on the expansion strip, after which the set screw is tightened to lock the retainer strip in its adjusted position. By this arrangement, it is possible to so effect the desired adjustments, after the thermometers are in place, that the temperature readings for the various instruments shall be uniform. The permissible degree of adjustment for the movable piece or retainer strip K is sufficient to cover a range of over 200° of heat.

Preferably the operating or interior mechanism is carried by a retainer ring O fitting within the shell C. The ring O is provided with an elongated slot K² to receive the retainer strip K. The slot K² is longer than the strip K to allow of the adjusting motion described above.

In order to permit the base of the thermometer to be secured to an oven door, even if all coöperating parts do not happen to exactly register, I provide the base of the ring B with projections R and R' which have apertures S and S' of considerably greater size than the diameters of the clamping screws T and T' which engage screw-threaded holes (not shown) in the oven door. Adjustable clamping plates U and U', having elongated slots, are fastened to the projections R and R' by clamping screws U² and U³ that project through the said slots, these clamping plates having screw-threaded holes to receive the screws T and T'. As the front of the thermometer is sometimes covered by an escutcheon which is also held in permanent position by screws, it has heretofore been impossible to get the escutcheon in place without practically disassembling the door for realinement. In the present construction, the thermometer can be fastened to the door and the screws T and T' left somewhat loose so as to permit the thermometer to be moved in any direction to line the base up correctly with the escutcheon, after which the screws can be tightened up from the inside of the oven.

A thermometer constructed as above described can be more conveniently attached to its support than previous thermometers of this type, and the tension of the expansion strip accurately adjusted without disassembling the thermometer. The invention, however, is not limited to the particular construction shown for obtaining these advantages except as specified in the appended claims.

What I claim as my invention is:—

1. In a thermometer, the combination with a casing having a dial and supported upon the outside of an oven but in open communication with its interior, of a hand movable over said dial, an expansion strip within said casing for moving said hand in accordance with changes in oven temperature, and means extending to the exterior of said casing and located permanently outside the oven for adjusting said expansion strip.

2. In a thermometer, the combination with a casing having a dial and supported upon the exterior of an oven, of a hand movable over said dial, an expansion strip within said casing for moving said hand in accordance with changes in oven temperature, a circumferentially adjustable strip to which one end of said expansion strip is secured, and means operable, at all times, from the exterior of the casing and the oven for adjusting said ring.

3. In a thermometer, the combination with a casing supported upon the outside of an oven but in open communication with its interior, of indicating mechanism therein, an expansion member within said casing, and means for adjusting said expansion strip after the thermometer is in place, without disassembling or detaching the thermometer.

4. In a thermometer, the combination with a casing, of an angle ring surrounding the bottom of said casing, laterally adjustable plates secured to said ring, and means for clamping said adjustable plates to the outside of an oven.

5. In a thermometer, the combination with a casing having a dial and adapted to be mounted upon the outside of an oven, of a hand movable over said dial, an expansion strip within said casing for moving said hand in accordance with changes in temperature, an internal circumferentially adjustable member to which one end of said expansion strip is secured, and a set-screw engaging said adjustable member and projecting through the casing and outside the oven, said set-screw being adapted to have clamping engagement with the casing in the various positions to which it may be adjusted.

6. In a thermometer, the combination with a casing, of an angle ring surrounding the bottom of said casing and having apertures in the base portion thereof, plates mounted upon the base of said angle ring and extending across said apertures, means for so securing said plates to said angle-ring base as to allow adjustment thereof transversely of the apertures, and members engaging said plate and projecting freely through the apertures of the ring base to secure said thermometer in place.

In testimony whereof I affix my signature in the presence of two witnesses.

LLOYD G. COPEMAN.

Witnesses:
   D. W. OVALTT,
   E. M. MARCHAM.